United States Patent [19]

Aidlin et al.

[11] Patent Number: 4,886,567
[45] Date of Patent: Dec. 12, 1989

[54] PLASTIC COMPOSITE BOTTLES AND METHOD AND APPARATUS FOR THEIR FABRICATION

[75] Inventors: Samuel S. Aidlin; Stephen H. Aidlin; Larry Kincaid, all of Sarasota, Fla.

[73] Assignee: Aidlin Automation Corp., Bradenton, Fla.

[21] Appl. No.: 193,046

[22] Filed: May 12, 1988

[51] Int. Cl.⁴ ............................................. B29C 65/08
[52] U.S. Cl. .................................... 156/423; 156/556; 156/567; 156/580.2; 156/583.1
[58] Field of Search ..................... 156/73.1, 423, 580.2, 156/580.1, 583.1, 583.7, 556, 567; 215/1 C, 100 R

[56] References Cited

U.S. PATENT DOCUMENTS

| | | | |
|---|---|---|---|
| 4,293,359 | 10/1981 | Jakobsen | 215/1 C |
| 4,395,300 | 7/1983 | Hoffmann | 156/567 |
| 4,724,035 | 2/1988 | Mann et al. | 156/423 |

Primary Examiner—Michael Wityshyn
Attorney, Agent, or Firm—Dominik, Stein, Saccocio, Reese, Colitz & Van Der Wall

[57] ABSTRACT

Plastic composite bottles fabricated of polyethylene terephthalate (PET). The bottles comprise a container portion and a base portion. The base portion is formed with an upwardly extending annular saddle to contact and support the spherical lower end of the container portion. The two portions are welded together at the saddle. This invention also relates to the method of, and apparatus for, welding together such portions.

4 Claims, 4 Drawing Sheets

PLASTIC COMPOSITE BOTTLES AND METHOD AND APPARATUS FOR THEIR FABRICATION

BACKGROUND OF THE INVENTION

1. Field of the Invention

This invention relates to plastic composite bottles and, more particularly, to polyethylene terephthalate (PET) bottles comprising a container portion and a base portion, the base portion being formed with an upwardly extending annular saddle to contact and support a spherical lower end of the container portion and with the two portions being welded together at the saddle. This invention also relates to the method of, and apparatus for, welding together such portions.

2. Description of the Background Art

Various types of plastic bottles manufactured from synthetic resins are in wide use throughout the carbonated beverage industry, principally because of their economical cost of manufacture. Such plastic bottles are usually formed from injection molded parisons with an elongated container portion. The parisons are blow-molded to their intended size and shape by positioning them in a blow-molding unit, applying heat, and then injecting air to thereby blow-mold them into the desired shape.

Experience has shown that the blow-molding of bottles with flat bottoms is not satisfactory in terms of stability in remaining vertically erect while at rest and in terms of durability against deformation during use. Consequently, virtually all blow-molded parisons include rounded bottoms to which is attached an injection-molded base cup portion to form a composite bottle. The base cup portion provides great stability and durability to the bottle.

The background art discloses many types of composite bottles as well as many methods and apparatus for welding their upper container portions with their lower base cup portions. Consider, for example, U.S. Pat. No. 4,609,418 to Yoshino. According to that patent, an upper container portion with a spherical lower end is attached to a lower base cup portion. The lower base cup portion has an upstanding saddle for contacting and supporting the spherical lower end portion of the container portion. An adhesive is applied between the container portion and the base cup portion at the saddle area. The use of adhesives, however, increases the cost of the resulting composite plastic bottle since an additional element, the glue, has been added. The use of glue also constitutes an added element of inconvenience to the fabrication method and machinery. Further, the addition of glue complicates the ability to recycle such plastic bottles after their use. It has been an increasing practice to recycle used plastic bottles and to fabricate new bottles from such materials. If a foreign substance such as the glue is part of the recycled material, an additional step must be added to the recycling process in order to remove such glue. Such complication thereby adds to the time and cost of the recycling which increases the cost of the resulting recycled bottle.

Also disclosed in the background art is the welding together of upper container portions and the lower base cup portions to form composite bottles. Note, for example, U.S. Pat. No. 4,331,246 to Sorensen and Canadian Patent No., 124,470 to Jakobsen. According to such disclosures, the coupling of the container and base cup portions is effected by a weld, such weld being effected at a central point of contact therebetween. The weldment is thus a single spot of variable size along the vertical central axis of the bottle, container portion and base cup portion. As a result, the size and nature of the welded portion, as well as the strength of attachment between the welded portions, will create problems of consistency in the resulting composite bottle. Further, during the fabrication process, when a circular welding element contacts a single central area of the base cup portion, the support is at such central area only thereby providing minimum stability and support for the base cup. This thereby tends to result in inferiorly joined composite plastic bottles.

Typical continuous and automatic machinery for fabricating composite plastic bottles is disclosed in U.S. Pat. No. 4,132,584 to Aidlin and in U.S. patent application Ser. No. 06/931,178 filed Dec. 10, 1986 in the name of Aidlin and assigned to the assignee of the instant invention, now U.S. Pat. No. 4,765,119. Such typical machinery with their attendant methods, do not disclose, teach or suggest the welding of the spherical lower end of containers with the raised saddle portions of base cup portions for the fabrication of superiorly joined bottle portions and, thereby, superior composite bottles.

None of this background art discloses or teaches or suggests a composite plastic bottle characterized by an efficiently joined base cup portion and container portion as herein disclosed and claimed. Further, there is no known background art which discloses or teaches or suggests a method of, or apparatus for, the efficient, convenient, accurate and economic fabricating of composite plastic bottles with annular weldments as described and claimed herein. The methods, apparatus and bottles of the background art are simply lacking in one regard or another.

As illustrated by the large number of background patents and known commercial techniques, efforts are continuously being made in an attempt to improve composite plastic bottles and to manufacture them more efficiently, conveniently, reliably and economically. None of these previous efforts, however, provides the benefits attendant with the present invention. Additionally, prior techniques do not disclose, teach or suggest the present inventive combination of component elements and method steps as disclosed and claimed herein. The present invention achieves its intended purposes, objectives and advantages over the prior art devices through a new, useful and unobvious combination of component elements which is simple to use, with the utilization of a minimum number of functioning parts, at a reasonable cost to manufacture and use and by employing only readily available components.

Therefore, it is an object of this invention to provide an improved plastic bottle formed of a container and a base cup for receiving one end of the container, the base cup having an annular area for contacting and supporting the recessed end of the container, the container and the base cup being welded together at the annular area.

It is a further object of the invention to provide apparatus for joining together a lower base cup component and upper container component of a composite bottle by an annular weldment.

Lastly, it is a further object of the invention to weld together the container and base cup portions of a composite plastic bottle at the saddle area of the base cup.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into an improved plastic bottle formed of a container and a base cup for receiving one end of the container. The base cup has an annular area for contacting and supporting the received end of the container with the container and the base cup being welded together at the annular area. The one end of the container received by the base cup is spherical while the annular area of the base cup portion is raised with respect to its adjacent areas and constitutes a surface area which conforms to the contacted spherical area of the container. The container and the base cup are also in contact with each other at a circular area adjacent to their peripheries. The base cup is formed with a flat portion on the side thereof remote from the container and the area of weld.

The invention may also be incorporated into a bottle comprising an upper container portion having an open upper end and having a closed, spherically shaped, lower end. A lower base cup portion has an open upper end for receiving the lower end of the upper portion and also has a closed lower end with an annular saddle extending upwardly therefrom to contact and support the lower end of the upper component. And an annular weldment joins together the upper portion and the lower portion at an annular area which includes the annular saddle. The upper container portion, the lower base cup portion and the weldment are all symmetric about a common vertical axis. The upper container portion is blow molded of polyethylene terephthalate with a threaded opening in a neck at the end thereof remote from the base cup portion. The lower base cup portion is injection molded or thermo formed of polyethylene terephthalate with a flat area on the side thereof remote from the container portion. The upper container portion and the lower base cup portion are spaced from each other both radially internal of the weldment and radially external of the weldment.

Further, the invention may also be incorporated into apparatus for fabricating a composite plastic bottle by joining together a lower base cup component and an upper container component, such apparatus comprising: (1) lower means for supporting the lower component in an upright orientation and for applying an upward force thereon from beneath the lower surface of the lower component; (2) upper means for supporting the upper component in an upright orientation and for applying a downward force thereon; (3) drive means to urge the lower and upper components into contact with each other, such lower means being annular in shape whereby the upward force is applied to an annular area of the lower base cup component and the upper container component; and (4) electrical means for providing a flow of electrical current through the lower means while such lower means is in contact with the lower surface of the upper component to thereby weld together the upper component and the lower component for forming the composite bottle. The upper means includes frictional means slidably supporting the container component of the bottle and a pusher located in an opening in the upper end of the container component. The drive member is coupled with the pusher to move the pusher and container component downwardly whereby the lower surface of the container portion will contact the upper surface of the base cup portion. The lower means includes a sonic horn with an annular surface for supporting an annular area of the base cup portion and means to support such lower means against a force of such upper means tending to urge such upper container portion, lower base cup portion and lower means downwardly. The surface of the container component contacting the base cup component is spherical while the annular area of the base cup portion and lower means are shaped to conform to the contacted spherical area of the container component.

Lastly, the invention may be incorporated into a method of joining an upper container part of a composite plastic bottle and the lower base part of the composite bottle. The method steps comprise supporting the upper part in an upright orientation about a vertical axis and providing a downward force thereon; supporting the lower part in an upright orientation about a vertical axis aligned with the axis of the upper part and providing an upward force thereon to resist the downward force; and providing a flow of electrical current in an annular configuration through a sonic horn with a surface for supporting the lower part while the upper part is in contact with the lower part to thereby sonic weld together the upper and lower parts for thereby forming the composite bottle.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several Figures of the drawings.

DETAILED DESCRIPTION OF THE PREFERRED EMBODIMENT

Figure 1:
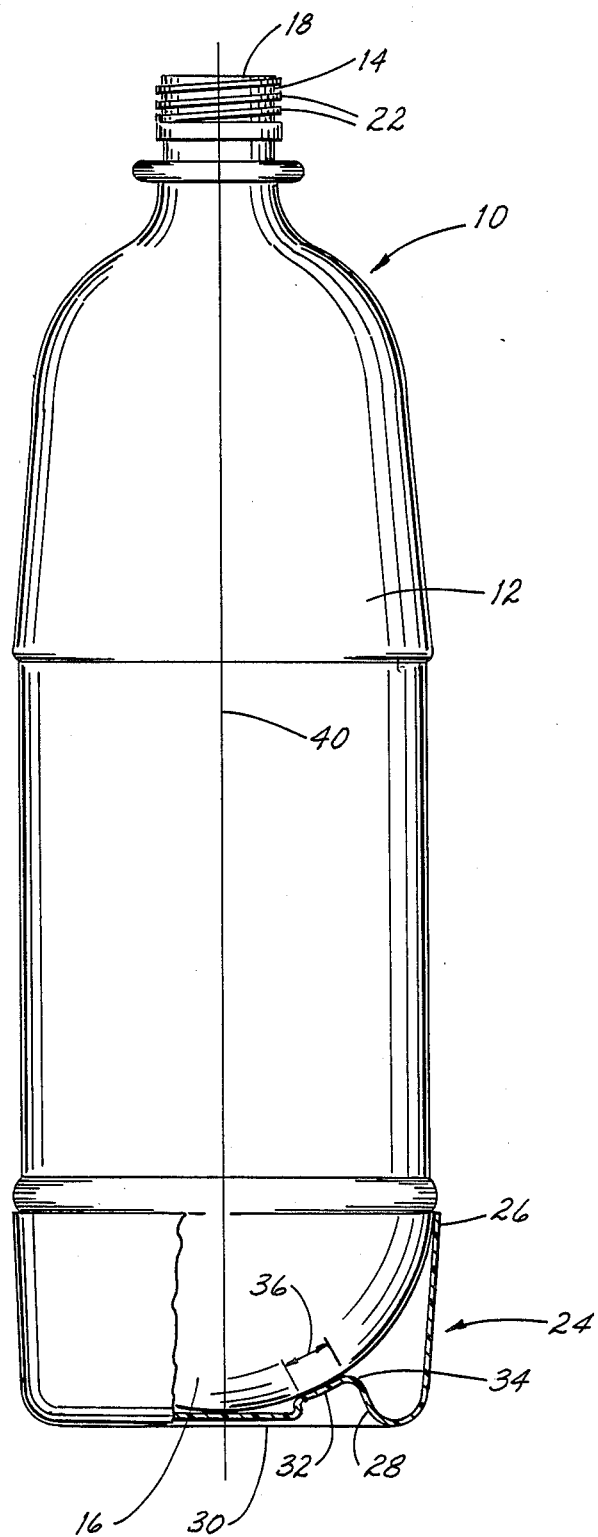
FIG. 1 is a sectional view of a composite plastic bottle embodying the principles of the instant invention.

FIG. 1 shows the preferred embodiment of a composite plastic bottle 10 fabricated in accordance with the principles of the present invention. The bottle comprises an upper container portion 12 or component having an open upper end 14 and having a closed, spherically shaped, lower end 16. The opening 18 at the upper end is for filling the bottle with fluids and for dispensing such fluids therefrom. The opening also functions in the joining of the bottle components as will be described hereinafter. The upper end of the container portion is of a thicker construction than the remainder of the bottle and includes extended screw threads 22 for receiving a threaded top for sealing the contents in the conventional manner.

The second portion or component of the bottle is a lower base cup portion 24 having an enlarged, open, upper end 26 for receiving the lower end 16 of the upper portion. The base cup portion also has a closed lower end 28 effectively constituting a flat surface 30 for stability in remaining vetically erect when at rest. An annular saddle 32 extends upwardly from the lower end 28 of the base cup to contact and support the lower end of the upper component 12. The final composite bottle also includes an annular weldment 34 joining together the upper portion and the lower portion at an annular area 36 which includes the annular saddle. The upper container portion 12, the lower base cup portion 24 and the weldment 34 are all symetric about a common vertical axis 40.

The upper container portion is preferably blow molded of polyethylene terephthalate, commonly referred to as PET, in the conventional manner. The lower base cup portion is preferably injection molded or thermo formed also of polyethylene terephthalate with a flat surface on the lower side 30, the side thereof remote from the container portion. When joined, the upper container portion and the lower base cup portion are spaced from each other both radially internal of the weldment and radially external of the weldment.

Figure 2:
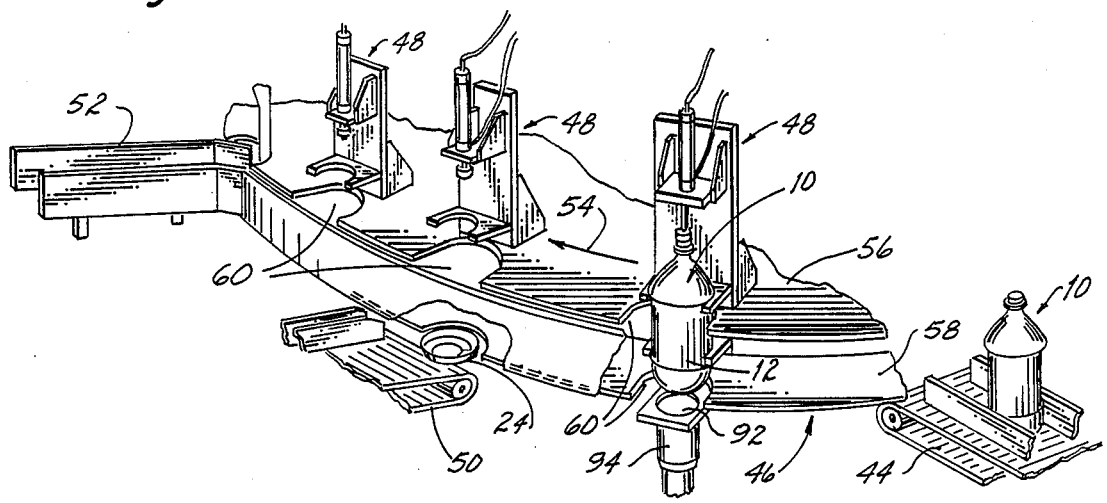
FIG. 2 is a perspective illustration of a continuous and automatic machine which may be utilized in the fabrication of the plastic bottle as shown in FIG. 1.

FIG. 2 illustrates the machine for manufacturing the composite plastic bottles. The machine comprises conveyors for the bottle components and cupping assemblies on a turntable located in operative association with the conveyors. A first conveyor 44 is for transporting formed upper container portions from a blow-molding machine, not shown, to the turntable 46 supporting the plurality of equally spaced cupping assemblies 48. A second conveyor 50 is for transporting formed base cup portions from an injection-molding machine, not shown, to the same turntable 46 supporting the same cupping assemblies. The base cup conveyor is down stream from the container conveyor while a bottle removing conveyor 52 is yet further down stream from the first two conveyors. Note the direction of the arrow 54 in FIG. 2.

The turntable includes circular support plates 56 and 58 with recesses 60 for receiving cupping assemblies and the bottle components to be joined. The turntable with its plates along with the support cupping assemblies and bottle components are all mounted for rotation about a vertical axis on a shaft which is journaled in a frame and driven by an appropriate motor through suitable control mechanisms, not shown. Further details of the turntable and conveyors may be had by reference to the above-discussed U.S. Patent and Application to Aidlin. These disclosures are incorporated by reference herein.

The container portions and the base cup portions produced in each molding cycle are fed in timed relationship onto the first and second conveyors respectively at locations remote from the turntable and cupping assemblies. These portions are then transported to the cupping assemblies for being joined together as by welding as will be discussed hereinbelow.

Figure 3:
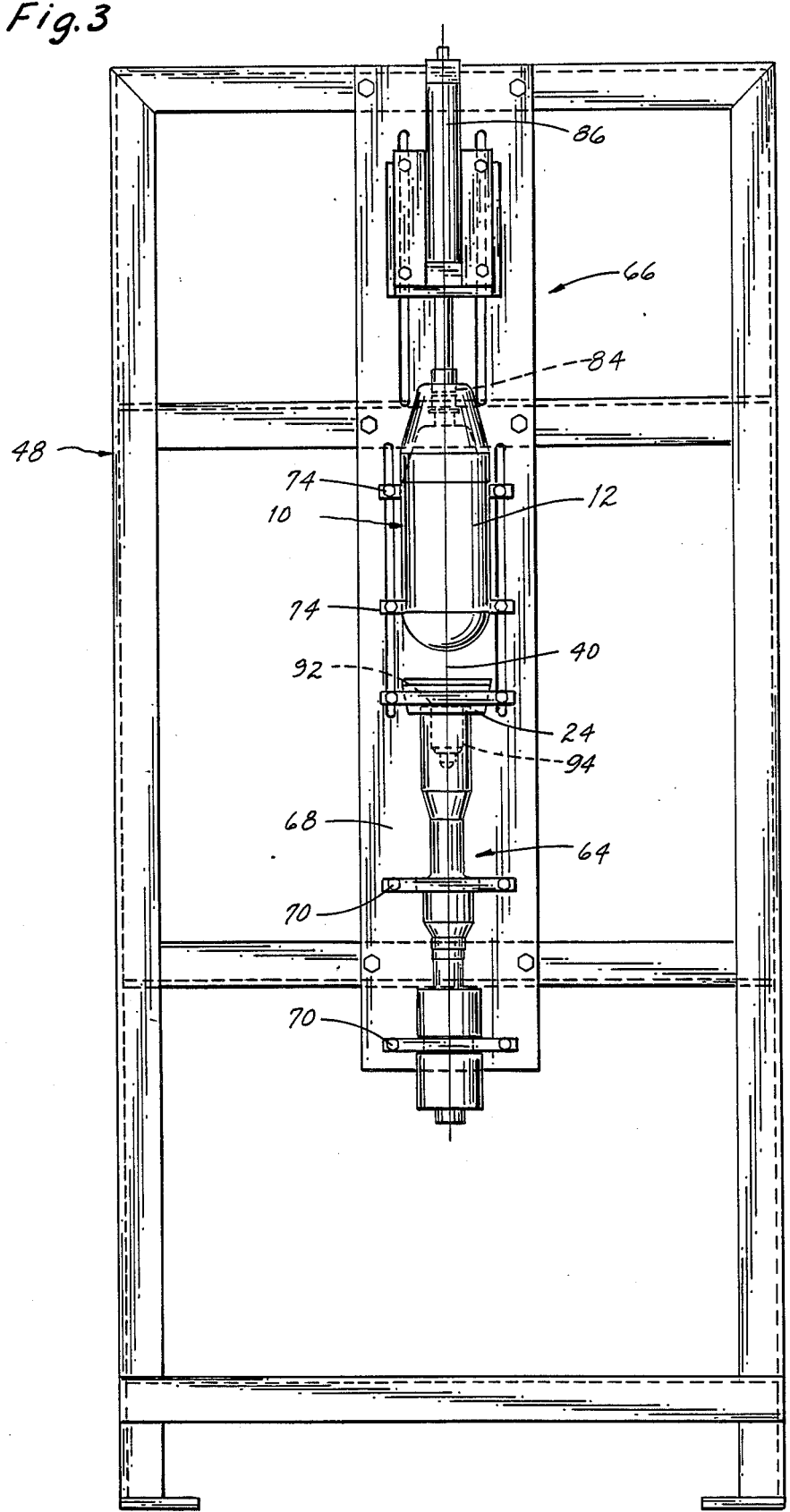
FIG. 3 is a front elevational view of welding components of the machine illustrated in FIG. 2.
Figure 4:
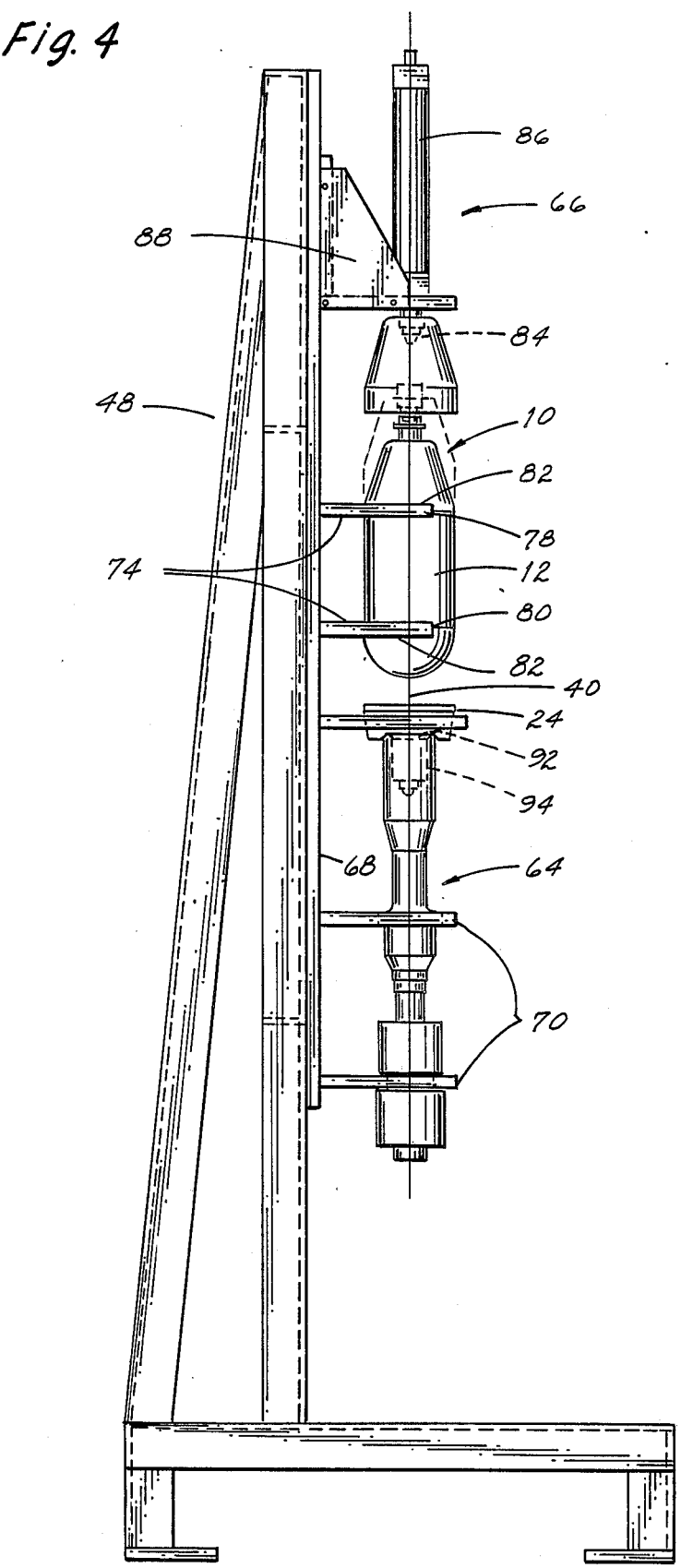
FIG. 4 is a side elevational view of the mechanisms shown in FIG. 3.

Details of the cupping assemblies for joining the components of the composite plastic bottles is best seen in FIGS. 3 and 4. Each cupping assembly 48 includes a lower subassembly 64 for supporting and transporting the base cup component in an upright orientation. Each cupping assembly also includes an upper subassembly 66 for supporting and transporting an upper container component in an upright orientation with respect to the lower base cups component and lower subassembly. The upper support subassembly and the lower support subassembly are each mounted on a vertical plate 68. The lower support includes brackets 70. An upward force is effectively applied by the brackets from beneath the lower surface of a base cup component resting thereon when a container is brought into contact therewith.

A complimentary upper support subassembly 66 includes upper brackets 74 formed as horizontal U-Shaped frictional fingers 78 and 80. Such fingers apply a frictional force on a container portion along the lower support assembly. The fingers of the upper support subassembly include frictional surfaces 82 slidably supporting the container component of the bottle. A pusher 84 slidably secured to the vertical plate is located in the opening 18 in the upper end of the container component. An appropriate drive member 86 is coupled therewith. The drive member 86 includes a piston in an air cylinder mounted for vertical reciprocation on a bracket 88 secured to the vertical plate 68. The pusher thus moves the container component downwardly with respect to the fingers whereby the lower surface of the container portion will contact the upper surface of the base cup portion. The lower subassembly 64 is formed with a sonic horn having an upwardly facing annular surface 92 for supporting an annular area of the base cup portion at the saddle. The supporting brackets 70 therefore support such lower subassembly and conductive annular surface against the force of such pusher and container portion which tends to urge such upper container portion, lower base cup portion and conductive annular surface downwardly.

The surface of the container component contacting the base cup component is spherical while the annular area of the base cup portion and lower means are shaped to conform to the contacted spherical area of the container component. A flow of air is preferably provided through the pusher 84 in the conventional manner to preclude the buckling of the upper container portion 12 during its movement downwardly.

It should be realized that the conductive annular surface of the lower subassembly may be other than the solid and continuous member as shown. Such surface 92 may take the form of a series of discrete conductive elements arranged an equal distance from the axis coextensive with the axis 40 of the bottle. Alternatively, the surface might be a conductive element or elements embedded in, or secured to a permanent support.

The drive member 86 is provided to cause relative movement between the pusher 84 and the fixed fingers 78 and 80 and lower support subassembly. The pusher functions to slide the container downwardly in the fingers to urge the lower and upper components into contact with each other. The lower surface 92 is annular in shape whereby the upward force is applied to an annular area of the lower base cup component and the upper container component. Electrical components 94 are included in the lower support subassembly for providing a flow of electrical current through the lower surface 92 while it is in contact with the lower surface of the lower base cup portion. The magnitude and timing of the current flow is readily determined and adjusted as a function of the materials to be welded and the area of the weldment. This welding occurs while the upper surface of the lower component is in contact with the lower surface of the upper component to thereby weld together the upper component and the lower component. This results in the formation of the composite bottle.

The present invention also relates to the method of fabricating a plastic composite bottle 10 by the joining of an upper container component 12 of a composite plastic bottle 10 and a lower base cup component 24 of the composite bottle 10. The method comprises the step of supporting the upper container component 12 in an upright orientation about a vertical axis 40 and providing a downward force thereon from a vertically reciprocating pusher 84 of an upper support subassembly 66.

The method also includes the step of supporting the lower base cup component 24 in an upright orientation about the same vertical axis 40 aligned with the axis of the upper container component. An upward force is provided by a lower support subassembly 64 to resist the downward force provided by the upper support assembly 66. A flow of electrical current is provided in an annular configuration through an electrode surface 92 or electrodes in the lower support subassembly 64 while it is supporting the lower component. The current flow will thereby weld together the upper and lower components 12 and 24 for thereby fabricating the composite bottle 10.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention.

Now that the invention has been described, what is claimed is:

1. Apparatus for fabricating a composite plastic bottle by joining together a lower base cup component and an upper container component, such apparatus comprising:

lower means for supporting the lower component is an upright orientation and for applying an upward force thereon from beneath the lower surface of the lower component;

upper means for supporting the upper component in an upright orientation and for applying a downward force thereon;

drive means to cause relative movement between the lower means and the upper means to urge the lower and upper components into contact with each other, such lower means being annular in shape over an extended radial distance whereby the upward force is applied to an annular area of the lower base cup component and the upper container component while said components are spaced from each other radially interiorly of said lower means; and electrical means for providing a flow of electrical current through the lower means while such lower means is in contact with the lower surface of the lower base cup component, and while the upper surface of the lower component is in contact with the lower surface of the upper component to thereby weld together the upper component and the lower component for thereby forming the composite bottle.

2. The apparatus as set forth in claim 1 wherein the upper means includes frictional means slidably supporting the container component of the bottle and a pusher located in an opening in the upper end of the container component and the drive means is coupled with the pusher to move the pusher and container component downwardly whereby the lower surface of the container component will contact the upper surface of the base cup portion.

3. The apparatus as set forth in claim 2 wherein the lower means includes a sonic horn with an annular surface for supporting an annular area of the base cup portion and means to support such lower means against a force of such upper means tending to urge such upper container portion, lower base cup portion and lower means downwardly.

4. The apparatus as set forth in claim 3 wherein the surface of the container component contacting the base cup component is spherical while the annular area of the base cup component and lower means are shaped to conform to the contacted spherical area of the container component.

* * * * *